US008732159B2

(12) United States Patent
Valentin (10) Patent No.: US 8,732,159 B2
(45) Date of Patent: May 20, 2014

(54) GENERIC OUTER JOIN ACROSS DATABASE BORDERS

(75) Inventor: Marco Valentin, Malsch (DE)

(73) Assignee: SAP AG, Walldorf (DE)

(*) Notice: Subject to any disclaimer, the term of this patent is extended or adjusted under 35 U.S.C. 154(b) by 0 days.

(21) Appl. No.: 13/335,783

(22) Filed: Dec. 22, 2011

(65) Prior Publication Data

US 2013/0166535 A1 Jun. 27, 2013

(51) Int. Cl.
*G06F 7/00* (2006.01)
*G06F 17/30* (2006.01)

(52) U.S. Cl.
CPC .... *G06F 17/30545* (2013.01); *G06F 17/30498* (2013.01)
USPC ...................................................... 707/714

(58) Field of Classification Search
None
See application file for complete search history.

(56) References Cited

U.S. PATENT DOCUMENTS

| | | | | |
|---|---|---|---|---|
| 5,903,887 A | * | 5/1999 | Kleewein et al. ...................... 1/1 |
| 5,903,893 A | * | 5/1999 | Kleewein et al. ............. 707/714 |
| 6,615,203 B1 | * | 9/2003 | Lin et al. ............................... 1/1 |
| 7,072,847 B2 | * | 7/2006 | Ulenas et al. ................. 705/7.29 |
| 7,979,314 B2 | * | 7/2011 | Ulenas .......................... 705/26.1 |
| 2001/0049685 A1 | * | 12/2001 | Carey et al. ............... 707/103 R |
| 2006/0085380 A1 | * | 4/2006 | Cote et al. .......................... 707/1 |

OTHER PUBLICATIONS

Nielsen et al, Microsoft SQL Server 2008 Bible, Publisher: John Wiley & Sons, Publication Date: Aug. 31, 2009, ISBN: 978-0-470-25704-3, Chapters 6,10 and 31.*

* cited by examiner

*Primary Examiner* — Jay Morrison
(74) *Attorney, Agent, or Firm* — Mintz Levin Cohn Ferris Glovsky and Popeo, P.C.

(57) ABSTRACT

Methods and apparatus, including computer program products, are provided for receiving an indication of a defined outer join to enable obtaining a first database table at a first database and a second database table at a second database; sending a first request to the first database to obtain the first database table; sending a second request to the second database to obtain the second database table; receiving, in response to the first and second requests, each of the first and second database tables; performing an outer join on the received first and second database tables, the outer join forming an output database table; and providing the output database table.

15 Claims, 7 Drawing Sheets

FIG. 1A

Table 192A

| Country | Product | Sales |
|---------|---------|-------|
| US | Alpha | 3,000 |
| US | Beta | 1,250 |
| JP | Alpha | 700 |
| UK | Alpha | 450 |

Row Store 192B

| Row 1 | US | Alpha | 3,000 |
| Row 2 | US | Beta | 1,250 |
| Row 3 | JP | Alpha | 700 |
| Row 4 | UK | Alpha | 450 |

Column Store 192C

| Country | US | US | JP | UK |
| Product | Alpha | Beta | Alpha | Alpha |
| Sales | 3,000 | 1,250 | 700 | 450 |

| Display of Entries Found | | | | |
|---|---|---|---|---|
| Table Entry  Edit  Goto  System  Help | | | | |

Table to be searched: COEP
Number of hits: 5
Runtime: 0

CO Object: Line Items (by Period)

Maximum no. of hits: 0.000

| Val/COArea Crcy | Func. Area | FunctArea text | No.Entries |
|---|---|---|---|
| 189.492.557.514,99- | | | 219.398 |
| 142.037,26- | 0001 | Área Funcional 0001 | 206 |
| 6.749,35 | 0100 | Producción | 47 |
| 2.000,00 | 0400 | Administración | 2 |
| 83,25- | 0500 | Investig.y Desarrollo | 5 |

402 → Details

GENERIC OUTER JOIN ACROSS DATABASE BORDERS

FIELD

The present disclosure generally relates to database processing and, in particular, performing outer joins.

BACKGROUND

In databases systems, a join is a database instruction used to combine values (e.g., records) from two or more database tables stored at a single database. This combination may also form a database table at the database. There are various types of joins, such as inner, outer, left, and right, and some of these joins require common values in each of the tables being selected for the join. The outer join does not, however, require that the two tables being joined have common values, such as a matching record. The outer join may be configured as a left outer join, a right outer join, or a full outer join. The outer join is typically hard-coded using, for example, SQL, and the hard coding specifies the database (or connection) from which to obtain the tables for the outer join.

SUMMARY

In one aspect there is provided a method. The method may include receiving an indication of a defined outer join to enable obtaining a first database table at a first database and a second database table at a second database; sending a first request to the first database to obtain the first database table; sending a second request to the second database to obtain the second database table; receiving, in response to the first and second requests, each of the first and second database tables; performing an outer join on the received first and second database tables, the outer join forming an output database table; and providing the output database table.

In some implementations, the above-noted aspects may further include additional features described herein including one or more of the following. The outer join may be defined at a user interface by at least providing a first location of the first database and a second location of the second database. The indication may be received from a user interface. The first database may include at least one of an in-memory database and a column-based database. The second database may include a persistent relational database. The first request may instruct the first database to select at least a portion of the first database table. The outer join may be performed as at least one of a left outer join, a right outer join, and a full outer join on the received first and second database tables to form the output database table. The first and second requests may be sent to separate databases.

It is to be understood that both the foregoing general description and the following detailed description are exemplary and explanatory only and are not restrictive. Further features and/or variations may be provided in addition to those set forth herein. For example, the implementations described herein may be directed to various combinations and subcombinations of the disclosed features and/or combinations and subcombinations of several further features disclosed below in the detailed description.

DESCRIPTION OF THE DRAWINGS

In the drawings.

Like labels are used to refer to same or similar items in the drawings.

DETAILED DESCRIPTION

Figure 1A:
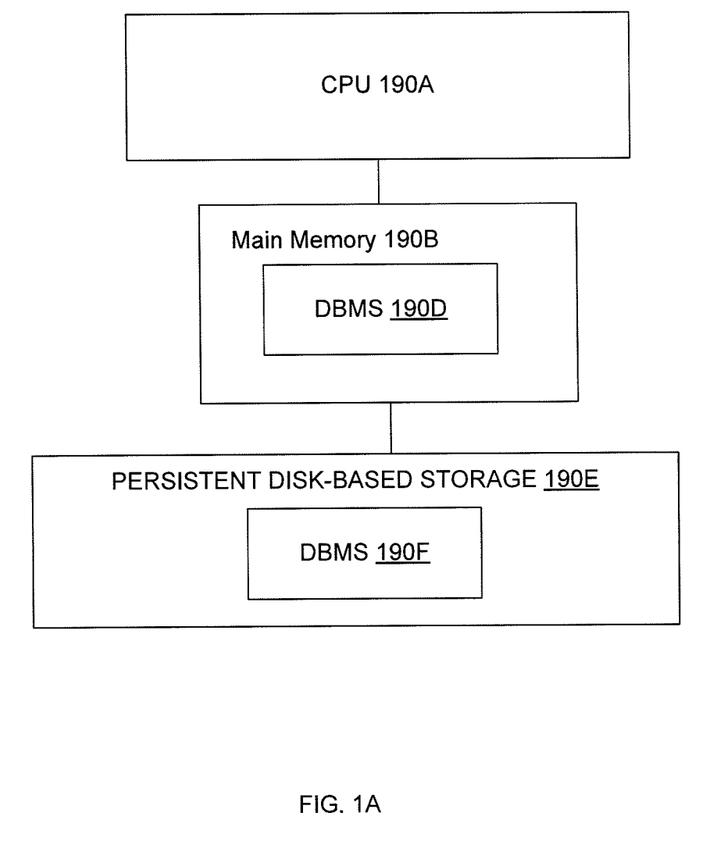
FIG. 1A depicts an example of an in-memory system.

In-memory databases refer to databases in which the data is stored in memory, rather than in slower persistent, mechanical storage, such as a hard drive, an optical drive, and the like. The use of in-memory databases may, in some implementations, enhance the performance of databases by speeding up data access times. FIG. 1A depicts a system including a central processing unit (CPU) 190A, main memory 190B including a database management system (DBMS) 190D, and a persistent, disk-based storage 190E including another DBMS 190F. In the example implementation of FIG. 1A, a database engine, such as DBMS 190D, and the relevant data for the database engine are primarily maintained in main memory 190B. When this is the case, any queries and/or calculations performed on the data use main memory 190B and database 190D, rather than disk-based storage 190E and database 190F. In some implementations, such use of main memory 190B reduces data access latency times by at least an order of about 200.

Figure 1B:
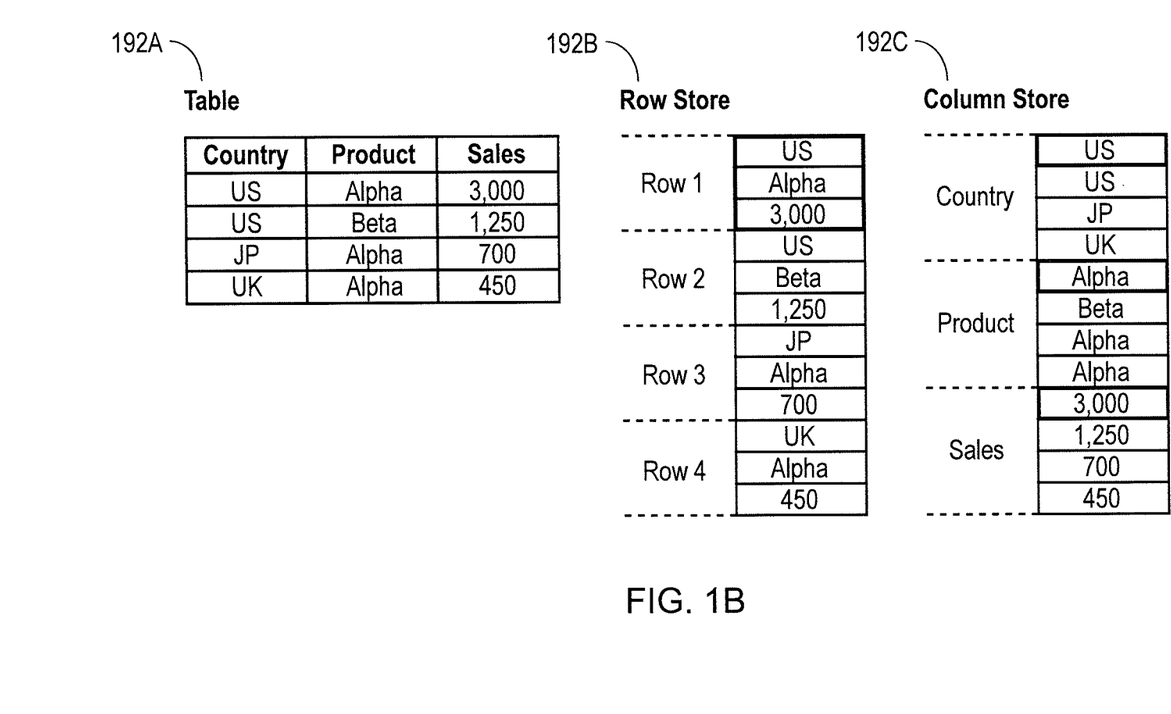
FIG. 1B depicts an examples of column store and row store.

In-memory databases may also be configured as column-based databases, which in some implementations may further enhance performance. Referring again to FIG. 1A, the database 190D may be implemented as a column-oriented database, although a row-oriented database may be used as well. A column-oriented database refers to a database management system configured to store relevant data based on columns, not rows. On the other hand, a row-oriented database refers to a database management system configured to store relevant data based on rows, not columns. FIG. 1B depicts a table 192A including relevant data for country, product, and sales. In a row-oriented database, the relevant data is stored based on rows as depicted at row store 192B; while in a column-oriented database, the relevant data is stored based on columns as depicted at column store 192C. Although the examples described herein refers to in-memory column databases, other types of databases may be used as well.

An in-memory database may be configured to store the data of a business system, such as an enterprise resource planning system, a sales force management system, a personnel management system, and the like. However, the volume of data associated with a user's business system may often exceed the capacity of the in-memory database system, such as in-memory database 190D. When this is the case, some of the relevant business data may be stored in the in-memory database 190D, while other, less relevant data (which is used infrequently) may be archived in persistent storage 190E at another database 190F. For example, the in-memory database 190D may store transactional data, such as credit card numbers, sales orders, and other frequently accessed data, while less frequently accessed or less relevant data, such as employee performance reports, etc., may be archived at database 190F at persistent storage 190E. As such, the in-memory database 190D may not contain all of the business data for a given user, but merely a subset of the user's data set as some of the user's relevant, transactional business data may be stored at the in-memory database 190D, while other data may be persistently stored in a traditional, persistent relational database 190F.

The subject matter disclosed herein relates to using an outer join to access the data from the persistent database 190E when needed to augment the data at in-memory database 190D. This augmentation serves to supplement, or enrich, the in-memory database 190D with some of the persistently stored data at database 190F. For example, when data is required from the persistent database 190F, a process disclosed herein may select data (e.g., database tables, records, and the like) from the in-memory database 190D and select data from persistent database 190F. The selected data may then be processed as an outer join, which generates an output database table that can be presented at a user interface and/or stored as a separate table at in-memory database 190D, making thus the selected data from persistent database 190F accessible at a database table at in-memory database 190D.

Figure 1C:
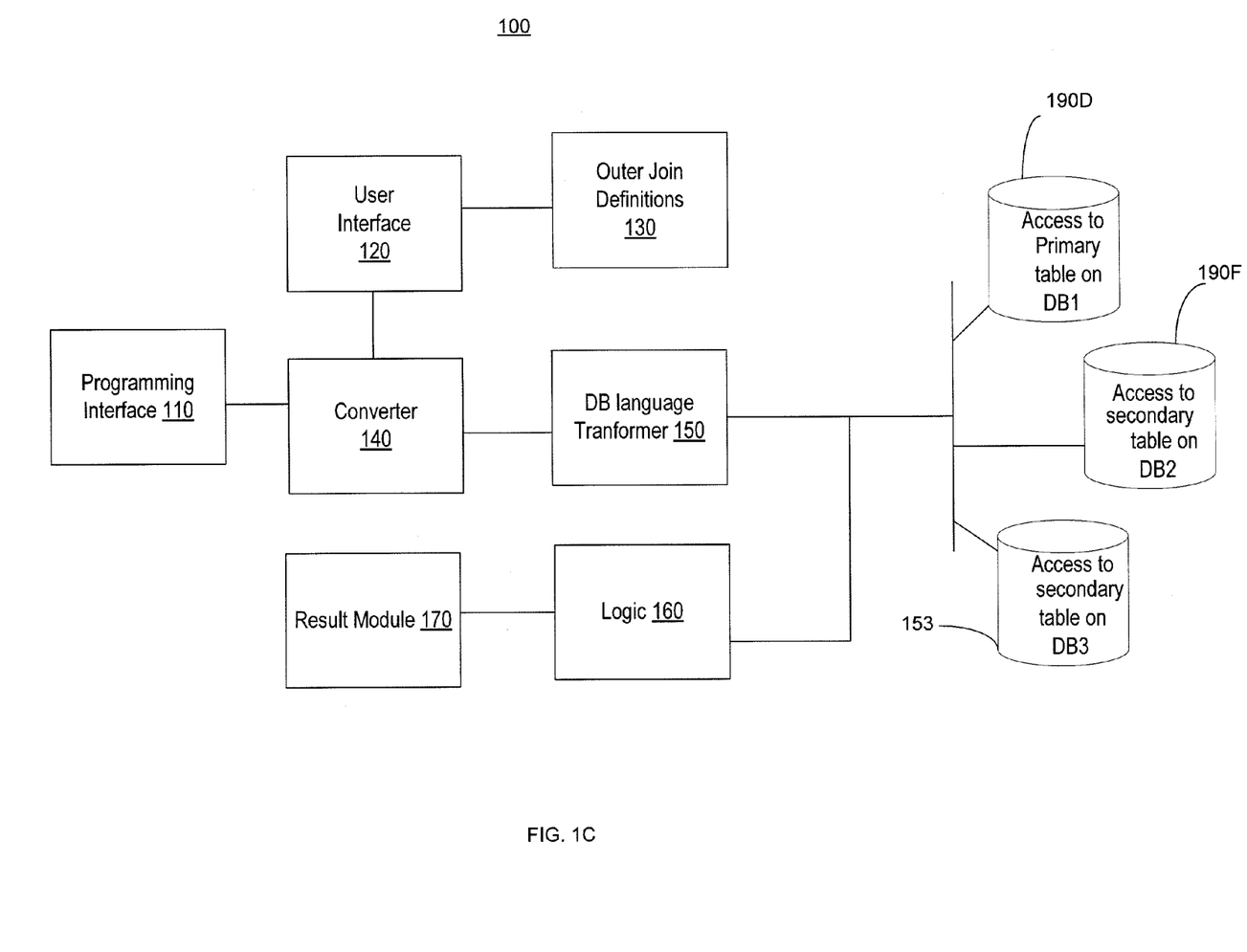
FIG. 1C depicts an example system for performing outer joins using database tables from different databases.

FIG. 1C depicts an example of a system 100 for performing outer joins on a plurality of databases. System 100 may, in some implementations, be configured to enable the selection and definition of the outer joins for database tables, which may be in different, physical databases.

System 100 includes a programming interface 110, where users may couple to in order to access system 100. For example, a user interface and/or other module may couple to system 100 via programming interface 110. The programming interface 110 may be coupled (e.g., via a link or a network, such as the Internet and/or an intranet) to a converter 140, which is described further below.

System 100 may include a user interface 120. The user interface 120 may be implemented as any type of user interface (e.g., a browser, a thin client, and the like) enabling access to converter 140 and/or for presenting pages (e.g., HTML pages). User interface 120 may be configured to allow a user to provide information defining the outer joins of the database tables. For example, the provided information may define the location of the databases and the corresponding database tables to be outer joined.

Figure 2:
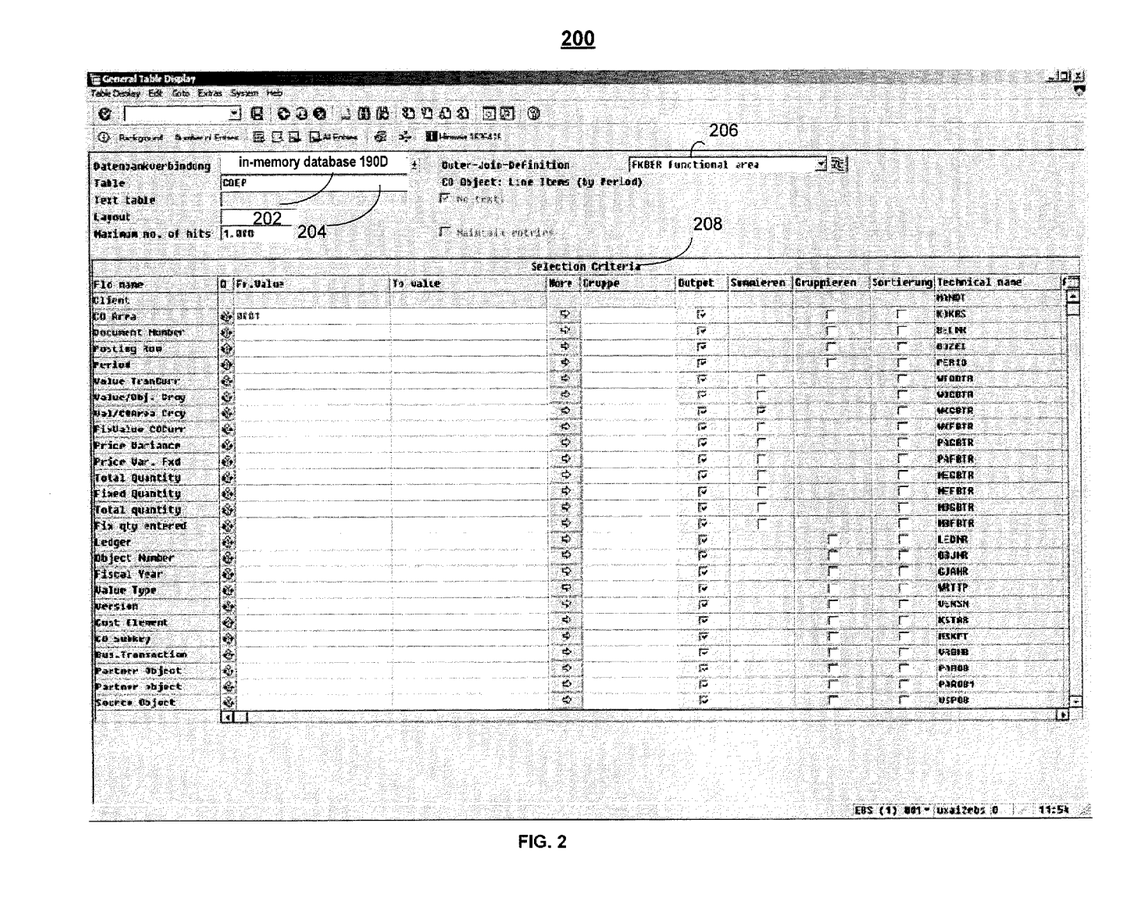
FIGS. 2-3 depict examples of pages for defining aspects of the outer join.
Figure 3:
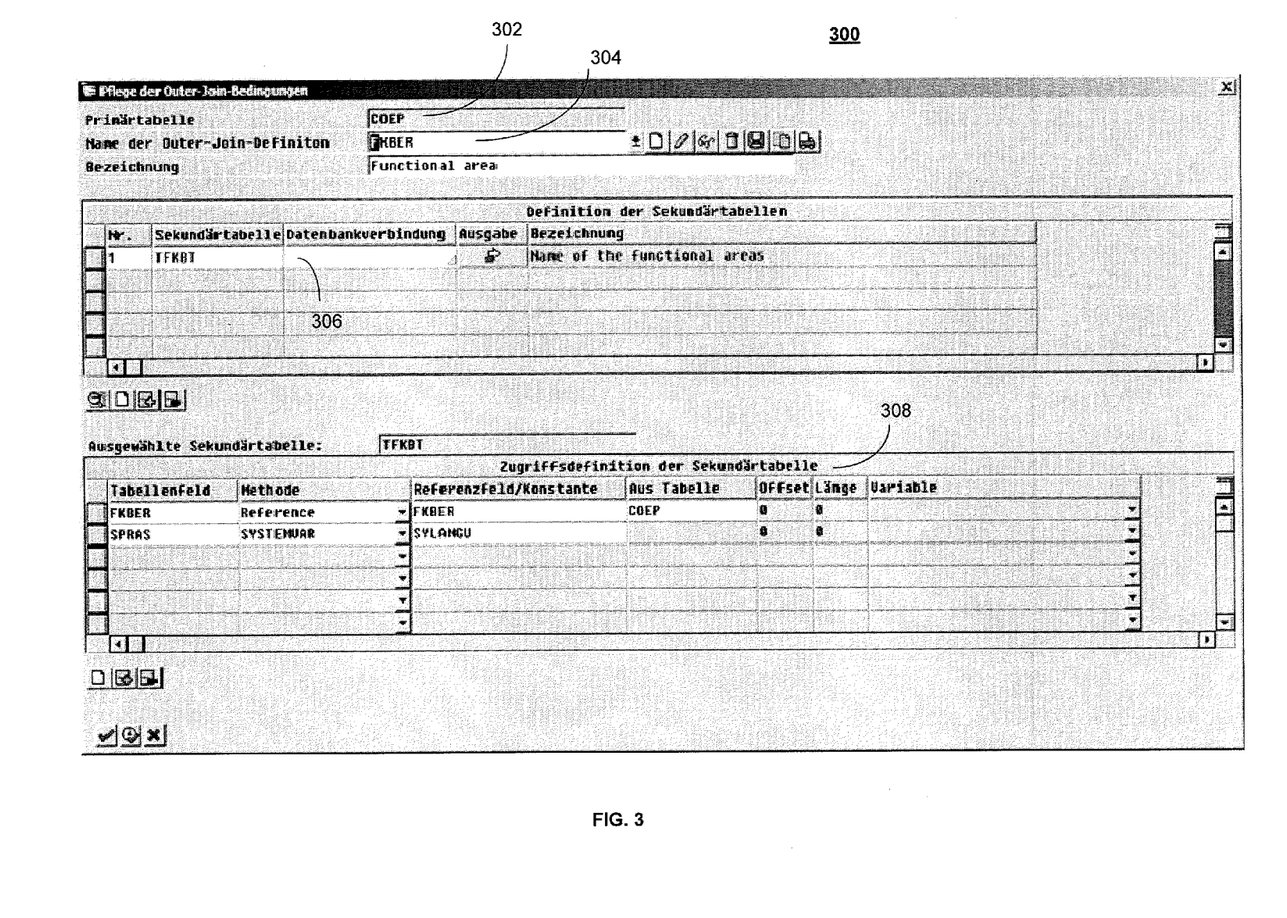

FIG. 2 depicts an example page 200 presented at user interface 120. Page 200 allows a user to select, at 206, an outer join to execute at system 100. For example, the user may select "FKBER Functional Area" at 206 as the outer join to execute at system 100. If that outer join has been defined as disclosed herein and stored at outer join definition module 130, the system 100 may execute the outer join. If the outer join has not been defined, the page 300 (described below) may be presented at user interface 120. Page 200 also shows that the first database to be selected for the outer join is an in-memory database 190D and the database table at in-memory database 190D should contain text data after the outer join with a corresponding database table at persistent database 190F. Although the example of FIG. 2 describes database 190D as an in-memory database and database 190F as a persistent database, other types of databases may be implemented as well (e.g., database 190D may be configured as a persistent database and database 190F may be configured as an in-memory database).

Once a user selects at 206 an outer join definition, page 300 may be presented at user interface 120. At user interface 120, page 300 may include, or allow definition of, the information 302 defining a database table 302 at the in-memory database 190D, information 304 identifying the outer join definition ("FKBER"), information defining a database table 306 at the persistent database 190F where information can be selected for the join (which in this example is textual information for the COEP table), and information 308.

A user may provide information at FIG. 3 to define the relationships between the database table at in-memory database 190D by providing information at 202 and designating another database table (e.g., persistent table TFBKT 306). At 308, relationships at the column level of the databases are defined. In the example at page 300, one text in the current logon language is read for each line provided by the in-memory database table defined at 202. Although this is a 1:1-relationship, a 1:N-relationship may be defined as well (e.g., one line of table 202 may read the total value of 2000 lines in table 306). In the 1:N example, system 100 totals the requested values for the 2000 lines and provides them in one result field in the final output database table. The definitions provided at FIG. 3 may use several methods, such as a reference link to an existing field at the database/database table defined at 202, a constant value to a fix value for one field, a complex variable of a database table, where the user can develop logic to fill the column content of a database table, a string operation to allows using portions of content of an existing field in the database/database table defined at 202, and/or a system variable for predefining system fields. The user may also define a sequence of outer joins, in which case 306 would define additional database tables at persistent database 190F. The information at page 300 effectively defines the location of the first and second databases and the database tables therein which will be the subject of the outer join. The information included at page 300 is provided to converter 140.

The converter 140 may be configured to receive information defining the outer join. This received information may include the identity of the outer join, the location of the databases (or databases connections) from which to access the database tables, and the identity of the database tables that are the subject of the outer join at each of the databases. This information may be received from user interface 120 (e.g., as page 300) and/or from another interface or processor via programming interface 110. For example, the information provided at user interface 120 (e.g., page 300) may be converted into instructions for an outer join by selecting a database table at the first database, such as in-memory database 190D, and selecting a database table at a second database, such as persistent database 190F. Converter 140 may be configured to process any inputs (e.g., analyze, check, and convert into instructions for performing the outer join) from a received format into the formats used within system 100.

The system 100 may further include a database transformer 150 for transforming the outer join instructions output by converter 140 into one or more database commands in a format (or language) operative with the types of databases being accessed for the outer join. For example, if the first database 190D were defined as an in-memory database operative with SQL commands, then database transformer 150 would generate the commands to perform the outer join in a format compatible with the defined database 190D in order to select database tables for the outer join. If database tables at database 190F used a different format, database transformer 150 would generate commands in the format required by database 190F, allowing access to the database tables therein.

The system 100 further includes outer join definitions 130. The outer joins definitions may store predetermined definitions of any preconfigured outer joins defined at system 100. For example, the information provide via user interface 120, such as pages 200 and 300, define an outer join named "FKBER," which corresponds to specific databases, specific connections to those databases (identifying the location of those databases), and specific databases tables at each of the databases, so that the user can perform the FKBER outer join by invoking the stored outer join definition via user interface 120.

When databases commands are sent by transformer 150 to each of the databases 190D and 190F to perform the outer join, the databases 190D and 190F respond with outputs comprising data selected from each of the databases, which are provided to logic 160. Logic 160 performs the outer join on the outputs received from each of the databases 190D and 190F. For example, database transformer 150 may send select commands to obtain data from each of the databases 190D and 190F, and the databases 190D and 190F respond with the requested data (and/or database tables). Next, logic 160 performs an outer join using the data (and/or database tables) received from databases 190D and 190F. The output of logic 160 is an output database table representing an outer join of the data (or database tables) selected from each of the databases 190D and 190F.

Logic 160 may be configured to collect the result information from each of the data selections made from the databases, such as databases 190D, 190F, and 153. Logic 160 may create a field catalog (e.g., a structure and column names of the final output table) that includes all information of all database tables. For example, if the result provided by in-memory database 190D is content in column A and the result of provided by persistent database 190F is content in column A and B, then logic 160 may collect column A and columns A and B. As column A exists twice, logic 160 may convert the name of column A into column A1 to avoid duplicate names, so that the finally created output table contains column A, column A1 and column B.

Result module 170 may generate a page (e.g., a hypertext markup language (HTML) page and the like) depicting the results of the outer join. For example, the page may depict the output of logic 160 as an output database table representing the outer join of the data (or database tables) selected from each of the databases 190D and 190F. The resulting output database table from the outer join may be presented as a page at user interface 120. The resulting output database table from the outer join may also be stored at in-memory database 190D as well. An example of the output database table resulting from the outer join is depicted at page 400 of FIG. 4. Result module 170 may generate page 400 and provide page 400 to user interface 120.

Figure 5:
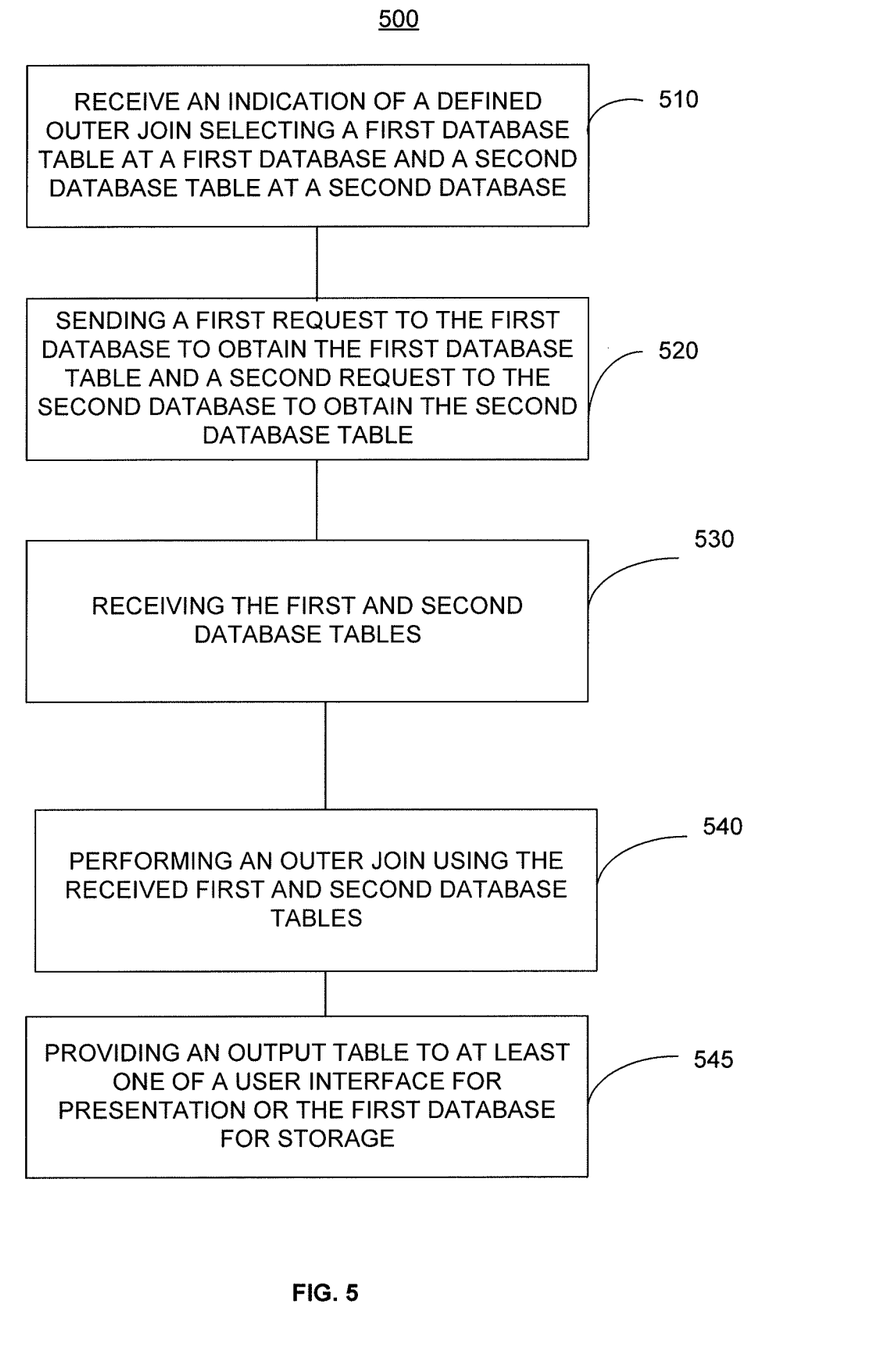
FIG. 5 depicts an example process for performing the outer join.

FIG. 5 depicts a process 500 for performing an outer join.

At 510, an indication may be received, and the indication may correspond to a defined outer join. For example, converter 140 may receive an indication from user interface 120 to perform an outer join. Moreover, the outer join may be predefined and stored in outer joins definition 130. For example, when the FKBER outer join is defined (e.g., via page 300) and stored in outer joins definition 130, page 200 may be used to invoke the FKBER outer join, initiating the selection of a database table at in-memory database 190D and the selection of a database table at another database, such as database 190F and/or 153.

At 520, a first request is sent to the first database and a second request is sent to the second database to obtain database tables. For example, converter 140 and database transformer 150 may send one or more commands to select a database table from in-memory database 190D. And, converter 140 and database transformer 150 may also send one or more command to select database tables from other databases, such as persistent database 190F or database 153.

Figure 4:
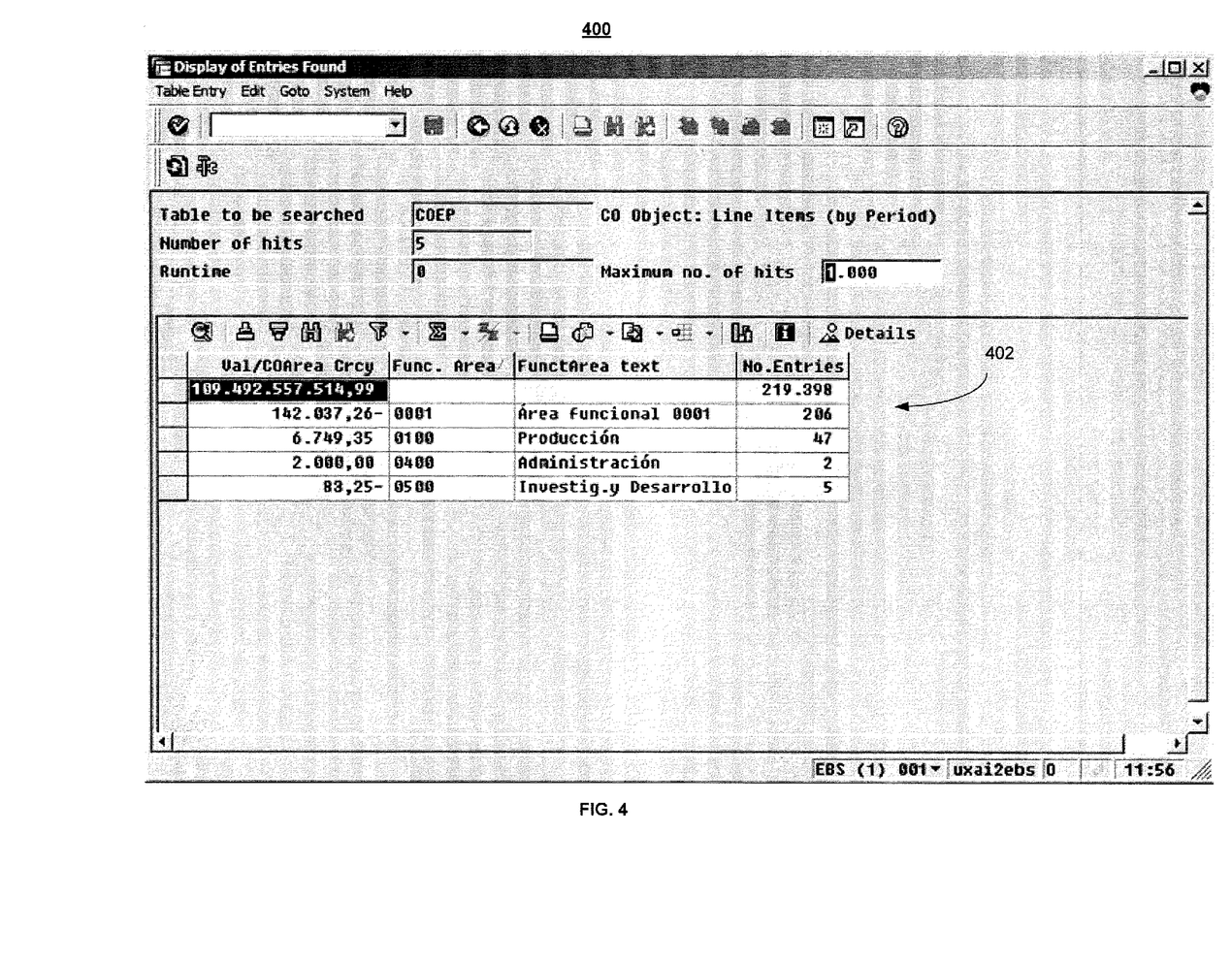
FIG. 4 depicts an example of a page depicting the result of an outer join.

At 530, the database tables are received. For example, logic 160 may receive a first database table from database 190D and a second database table from database 190F. At 540, logic 160 may perform an outer join of the first and second database tables to form an output database table. At 545, the logic 160 may provide the output database table (which represents the outer join of the first and second tables) to result module 170, which may generate a page, such as page 400, for presentation at user interface 120, and/or send the page (or the output database table) to another processor via programming interface 110. Results 170 may also store the output data base table at in-memory database 190D to enable in-memory access to that data.

In some implementations, by allowing the outer join to be defined using, for example, pages 200 and/or 300, the system 100 may execute an outer join statement for the primary database table of in-memory database 190D and the secondary database table at database 190F at a plurality of separate databases and without regard to the hard coding requirements imposed by hard coding, which require the database tables to be in a single database. These separate databases may be physically separate databases and/or different types of databases (e.g., using different technology, different languages, and/or the like). Moreover, the system 100 may allow, in some implementations, a user to flexibly define an outer join. For example, the user may provide information (e.g., via user interface 120 and pages 200 and/or 300) defining which database tables and databases to process as an outer join. When one of those databases is an in-memory database, the defined outer join may allow the data stored at in-memory database to be supplemented with the persistently stored data at a persistent database.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications, or code) include machine instructions for a programmable processor, and may be implemented in a high-level procedural and/or object-oriented programming language, and/or in assembly/machine language. As used herein, the term "machine-readable medium" refers to any non-transitory computer program product, apparatus and/or device (e.g., magnetic discs, optical disks, memory, Programmable Logic Devices (PLDs)) used to provide machine instructions and/or data to a programmable processor, including a machine-readable medium that receives machine instructions.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

Although a few variations have been described in detail above, other modifications are possible. For example, while the descriptions of specific implementations of the current subject matter discuss analytic applications, the current subject matter is applicable to other types of software and data services access as well. Moreover, although the above description refers to specific products, other products may be used as well. In addition, the logic flows depicted in the accompanying figures and described herein do not require the particular order shown, or sequential order, to achieve desirable results. Other embodiments may be within the scope of the following claims.

What is claimed:

1. A non-transitory computer-readable medium containing instructions to configure at least one processor to perform operations comprising:
receiving an indication of a defined outer join to enable obtaining a first database table at a first database and a second database table at a second database, the indication containing a first instruction for obtaining the first database table and a second instruction for obtaining the second database table, wherein the first database comprises at least one of an in-memory database and a column-based database and the second database comprises a persistent relational database;
sending a first request to the first database to obtain the first database table, the first request including the first instruction converted into a first format associated with the first type of the first database table;
sending a second request to the second database to obtain the second database table, the second request including the second instruction converted into a second format associated with the second type of the second database table;
receiving, in response to the first and second requests, each of the first and second database tables;
performing an outer join on the received first and second database tables based on at least one predetermined definition associated with the outer join, the outer join forming an output database table, the output database table being formed based on a field catalog containing information about all database tables in the first database and the second database; and
providing the output database table.

2. The computer-readable medium of claim 1, further comprising:
defining, at a user interface, the outer join by at least providing a first location of the first database and a second location of the second database.

3. The computer-readable medium of claim 1, wherein the indication is received from a user interface.

4. The computer-readable medium of claim 1, wherein the sending the first request instructs the first database to select at least a portion of the first database table.

5. The computer-readable medium of claim 1, wherein the performing further comprises:
performing at least one of a left outer join, a right outer join, and a full outer join on the received first and second database tables to form the output database table.

6. The computer-readable medium of claim 1, wherein the first and second requests are sent to separate databases.

7. A method comprising:
receiving an indication of a defined outer join to enable obtaining a first database table at a first database and a second database table at a second database, the indication containing a first instruction for obtaining the first database table and a second instruction for obtaining the second database table, wherein the first database comprises at least one of an in-memory database and a column-based database and the second database comprises a persistent relational database;
sending a first request to the first database to obtain the first database table, the first request including the first instruction converted into a first format associated with the first type of the first database table;
sending a second request to the second database to obtain the second database table, the second request including the second instruction converted into a second format associated with the second type of the second database table;
receiving, in response to the first and second requests, each of the first and second database tables;
performing an outer join on the received first and second database tables based on at least one predetermined definition associated with the outer join, the outer join forming an output database table, the output database table being formed based on a field catalog containing information about all database tables in the first database and the second database; and
providing the output database table.

8. The method of claim 7, further comprising:
defining, at a user interface, the outer join by at least providing a first location of the first database and a second location of the second database.

9. The method of claim 7, wherein the indication is received from a user interface.

10. The method of claim 7, wherein the sending the first request instructs the first database to select at least a portion of the first database table.

11. The method of claim 7, wherein the performing further comprises:
performing at least one of a left outer join, a right outer join, and a full outer join on the received first and second database tables to form the output database table.

12. The method of claim 7, wherein the first and second requests are sent to separate databases.

13. A system comprising:
at least one processor; and
at least one memory including code, which when executed by the at least one processor causes operations comprising:
receiving an indication of a defined outer join to enable obtaining a first database table at a first database and a second database table at a second database, the indication containing a first instruction for obtaining the first database table and a second instruction for obtaining the second database table, wherein the first database comprises at least one of an in-memory database and a column-based database and the second database comprises a persistent relational database;
sending a first request to the first database to obtain the first database table, the first request including the first instruction converted into a first format associated with the first type of the first database table;

sending a second request to the second database to obtain the second database table, the second request including the second instruction converted into a second format associated with the second type of the second database table;

receiving, in response to the first and second requests, each of the first and second database tables;

performing an outer join on the received first and second database tables based on at least one predetermined definition associated with the outer join, the outer join forming an output database table, the output database table being formed based on a field catalog containing information about all database tables in the first database and the second database; and providing the output database table.

14. The system of claim 13, further comprising:

defining, at a user interface, the outer join by at least providing a first location of the first database and a second location of the second database.

15. The system of claim 13, wherein the indication is received from a user interface.

* * * * *